3,072,185
IMPROVED FLOODING METHOD FOR THE RECOVERY OF PETROLEUM
Donald C. Bond and Le Roy W. Holm, Crystal Lake, Ill., assignors to The Pure Oil Company, Chicago, Ill., a corporation of Ohio
No Drawing. Filed Mar. 17, 1958, Ser. No. 721,638
6 Claims. (Cl. 166—11)

This invention relates to the recovery of residual oil from partially-depleted, oil-bearing geological reservoirs. It is more specifically concerned with an improved recovery process for stimulating the drainage of residual oil from limestone reservoirs normally not recoverable by conventional water-flooding or gas-injection-type, secondary recovery means.

The patent to Whorton et al., 2,623,596, discloses a method for secondary recovery of oil from producing formations involving pressuring with carbon dioxide followed by water flooding. The art has also taught the expedient of forming carbon dioxide in situ for increasing production of oil from reservoirs beneath the ground surface. Typical of such processes are those disclosed in Barton et al., 2,390,770, Merriam, 2,584,606, Walter, 2,734,578, and Pelzer, 2,788,071. These patents also suggest a water drive following in situ formation of carbon dioxide.

In accordance with this invention, carbon dioxide is formed in situ in the limestone oil-bearing reservoir, the formation is water-flooded at high pressure after a sufficient bank of carbon dioxide has been built up in the formation, and the injection wells are then shut in to produce under pressure-depletion conditions.

It is an object of the invention to provide an improved method for recovering residual oil from natural underground petroleum reservoirs. It is another object of the invention to recover larger amounts of residual oil from natural petroleum reservoirs than is possible with conventional flooding methods. Other objects of the invention will appear from the following description.

In carrying out the invention, combustion is initiated in the producing formation by any known method for so doing. One method is to lower a Piros burner to the bottom of the injection well and feed a mixture of air and gas to the burner. Instead of using air, oxygen or air enriched in oxygen is preferably used to avoid accumulation of large quantities of nitrogen in the formation. After combustion has been started the supply of fuel gas may be cut off and combustion continued of the carbon and oil present in the formation. Combustion is continued until approximately 500–3500 standard cubic feet of carbon dioxide is formed per barrel of oil in place. The combustion is then terminated and flood water is injected into the formation in order to build up a pressure of from approximately 700 to 2500 lbs. per square inch. The flood water may be fresh water, brine or a solution of carbon dioxide in water. In general the amount of flood water injected will be about 0.5 to 1 pore volume of water. Under these pressure conditions the carbon dioxide is miscible with the oil, thereby going into solution and allowing the water to more readily expel the oil from the formation.

Flooding with water is continued until a break-through of the water occurs at one or more producing wells. The injection wells are then shut in and production is continued under pressure-depletion conditions. The production may be continued at any desired rate but we prefer to conduct the production at such rate as to decrease formation pressure at the rate of 150–250 lbs. per square inch per year. Production may be continued until pressure decreases to close to atmospheric, or alternatively, production may be stopped when the pressure decreases to approximately 500 p.s.i.g. and the formation is again flooded with water while maintaining the pressure until water break-through occurs. Additional oil can be recovered by this technique.

As an example of the process, a Piros burner is inserted into the bottom of an injection well in a vugular limestone formation containing 50% of the oil originally in place. Natural gas is burned in the presence of air until a carbon dioxide-oil bank is formed equivalent in volume to about 10% of the total reservoir pore volume or equivalent to 500 s.c.f. of carbon dioxide per barrel of oil in place. Fresh water is then injected into the formation until breakthrough occurs at the production well. The injection well is then shut in and production is continued at a rate such as to bring about a reduction in formation pressure of approximately 200 lbs. per year. Between 80 and 90% of the residual oil in the formation is recovered.

It will be seen, therefore, that by a combination of in situ production of carbon dioxide, water flooding at high pressure, and production under pressure-depletion condition, a maximum production of residual oil from producing reservoirs can be effected.

What is claimed is:

1. The method of recovering oil from a subterranean formation, into which have been drilled at least one injection and one producing well, comprising producing carbon dioxide in situ in the formation by the combustion of a hydrocarbon with an oxygen-containing gas injected into said formation until at least about 500 s.c.f. of carbon dioxide per barrel oil in place have been formed, thereafter injecting floodwater into said formation through the injection well for a time and at a rate sufficient to pressure the formation to 700 to 2500 p.s.i., continuing said injection until water breakthrough occurs at a producing well, then shutting in the injection well to retain the pressure in the formation and producing additional oil from the formation through a production well under gradual pressure-depletion conditions.

2. Method in accordance with claim 1 in which production is continued until pressure is depleted to about 500 pounds per square inch and the formation is again flooded with water.

3. Method in accordance with claim 1 in which the formation is produced under pressure depletion at the rate of about 200 pounds per square inch per year.

4. Method in accordance with claim 3 in which the carbon dioxide is produced by the in situ combustion of oil initially contained in the formation and said combustion is supported with oxygen-containing gas having a low nitrogen content injected into the formation.

5. Method in accordance with claim 4 in which in situ combustion is continued until a carbon dioxide-oil bank is created equivalent in volume to about 5–25% of the total reservoir pore volume.

6. Method in accordance with claim 5 in which flood water is injected in an amount equivalent to about 0.5–1.0 pore volume.

References Cited in the file of this patent
UNITED STATES PATENTS

| | | |
|---|---|---|
| Re. 23,733 | Ferris | Nov. 10, 1953 |
| 2,390,770 | Barton et al. | Dec. 11, 1945 |
| 2,623,596 | Whorton et al. | Dec. 30, 1952 |
| 2,669,307 | Mulholland et al. | Feb. 16, 1954 |
| 2,788,071 | Pelzer | Apr. 9, 1957 |